(12) United States Patent
Wanami

(10) Patent No.: US 9,108,583 B2
(45) Date of Patent: Aug. 18, 2015

(54) VEHICLE SAFETY CONTROL SYSTEM

(71) Applicant: DENSO CORPORATION, Kariya, Aichi-pref. (JP)

(72) Inventor: Shingo Wanami, Kariya (JP)

(73) Assignee: DENSO CORPORATION, Kariya (JP)

( * ) Notice: Subject to any disclaimer, the term of this patent is extended or adjusted under 35 U.S.C. 154(b) by 81 days.

(21) Appl. No.: 14/166,027

(22) Filed: Jan. 28, 2014

(65) Prior Publication Data

US 2014/0222306 A1 Aug. 7, 2014

(30) Foreign Application Priority Data

Feb. 1, 2013 (JP) .................................. 2013-018427

(51) Int. Cl.
| | | |
|---|---|---|
| G06F 7/70 | (2006.01) | |
| B60R 21/0136 | (2006.01) | |
| B60K 28/14 | (2006.01) | |
| B60R 21/013 | (2006.01) | |
| B60R 21/0132 | (2006.01) | |
| B60R 21/01 | (2006.01) | |

(52) U.S. Cl.
CPC ............. *B60R 21/0136* (2013.01); *B60K 28/14* (2013.01); *B60R 21/013* (2013.01); *B60R 21/0132* (2013.01); *B60R 2021/01252* (2013.01)

(58) Field of Classification Search
None
See application file for complete search history.

(56) References Cited

U.S. PATENT DOCUMENTS

| | | | | |
|---|---|---|---|---|
| 4,626,850 A | * | 12/1986 | Chey .............................. | 340/903 |
| 5,995,037 A | * | 11/1999 | Matsuda et al. ................ | 342/71 |
| 6,438,472 B1 | * | 8/2002 | Tano et al. .................... | 701/29.6 |
| 7,639,148 B2 | * | 12/2009 | Victor ............................ | 340/576 |
| 9,050,930 B2 | * | 6/2015 | Walsh et al. .......................... | 1/1 |
| 2005/0004760 A1 | * | 1/2005 | Urai et al. ...................... | 701/301 |
| 2007/0032952 A1 | * | 2/2007 | Carlstedt et al. .............. | 701/301 |
| 2007/0112516 A1 | * | 5/2007 | Taniguchi ..................... | 701/301 |
| 2007/0185633 A1 | | 8/2007 | Baal et al. | |
| 2007/0192003 A1 | * | 8/2007 | Hashiba .......................... | 701/37 |

(Continued)

FOREIGN PATENT DOCUMENTS

| | | |
|---|---|---|
| JP | 2008-031943 | 2/2008 |
| JP | 2008-537920 | 10/2008 |

(Continued)

OTHER PUBLICATIONS

Office Action dated Jan. 29, 2015 in corresponding Japanese Application No. 2013-018427.

*Primary Examiner* — Calvin Cheung
(74) *Attorney, Agent, or Firm* — Harness, Dickey & Pierce, PLC

(57) ABSTRACT

A vehicle safety control system that executes a safety stop control for safely stopping a vehicle after a vehicle collision is detected is provided. The vehicle safety control system includes a first collision detector, a first collision determination part, a behavior detector, a behavior determination part, a traveling state determination part, a safety controller. The first collision detector detects the vehicle collision. The first collision determination part determines whether a first collision has occurred based on a detection result of the first collision detector. The behavior detector detects a vehicle behavior. The behavior determination part determines whether the vehicle behavior is abnormal based on a detection value of the behavior detector. The traveling state determination part determines whether a dangerous traveling is performed. The safety controller executes the safety stop control.

12 Claims, 6 Drawing Sheets

(56) References Cited

U.S. PATENT DOCUMENTS

| | | |
|---|---|---|
| 2008/0147280 A1* | 6/2008 | Breed .............................. 701/46 |
| 2008/0243558 A1* | 10/2008 | Gupte ................................ 705/4 |
| 2009/0002222 A1* | 1/2009 | Colburn et al. ............... 342/145 |
| 2009/0299576 A1* | 12/2009 | Baumann et al. ............... 701/45 |
| 2010/0004815 A1 | 1/2010 | Ewerhart et al. |
| 2010/0063680 A1* | 3/2010 | Tolstedt et al. ................ 701/41 |
| 2010/0114467 A1* | 5/2010 | Samuel et al. ................ 701/119 |
| 2011/0202305 A1* | 8/2011 | Willis et al. ................... 702/141 |
| 2011/0313740 A1* | 12/2011 | Ikeda et al. ....................... 703/2 |
| 2012/0232747 A1* | 9/2012 | Miners et al. ................ 701/33.9 |
| 2012/0259515 A1 | 10/2012 | Freienstein et al. |
| 2012/0330480 A1* | 12/2012 | Nishiseko ......................... 701/1 |
| 2013/0020789 A1* | 1/2013 | Yoo et al. ....................... 280/735 |
| 2013/0096769 A1* | 4/2013 | Kawamura et al. .......... 701/31.4 |
| 2013/0144459 A1* | 6/2013 | Ricci ................................. 701/1 |
| 2013/0187771 A1* | 7/2013 | Rothschild .................... 340/435 |
| 2013/0238192 A1* | 9/2013 | Breu .............................. 701/41 |

FOREIGN PATENT DOCUMENTS

| | | |
|---|---|---|
| JP | 2009-523640 | 6/2009 |
| JP | 2010-058724 | 3/2010 |
| JP | 2010-285015 | 12/2010 |
| WO | WO 2012/043388 | 4/2012 |

* cited by examiner

US 9,108,583 B2

VEHICLE SAFETY CONTROL SYSTEM

CROSS REFERENCE TO RELATED APPLICATION

This application is based on Japanese Patent Application No. 2013-18427 filed on Feb. 1, 2013, the disclosure of which is incorporated herein by reference.

TECHNICAL FIELD

The present disclosure relates to a vehicle safety control system that stops a vehicle safely after a first collision of the vehicle is detected.

BACKGROUND

A conventional vehicle safety control technology after a collision accident is disclosed in, for example, JP-A-2008-31943. In JP-A-2008-31943, a technology is disclosed by which, when an airbag ECU has detected the collision and determined an airbag deployment, a signal for instructing a fuel cutoff is sent to an engine ECU and a traveling of the vehicle is forcibly stopped, so that occurrence of a fire or the like is prevented.

An inventor of the present disclosure has found the following difficulty regarding a conventional safety control system.

It may be supposed that, even when a first collision of a vehicle is a slight collision or a curb contact, it is difficult for a driver to operate the vehicle safely, corresponding to a case where multiple accidents are prone to occur. However, by a technology disclosed in JP-A-2008-31943, a fuel cutoff is not performed unless an airbag is deployed. It is not considered to prevent a second collision after a slight first collision.

SUMMARY

It is an object of the present disclosure to provide the vehicle safety control system that prevents a multiple accident from occurring after a slight collision or a curb contact.

According to an aspect of the present disclosure, the vehicle safety control system that executes a safety stop control for safely stopping a vehicle after a vehicle collision is detected is provided.

The vehicle safety control system includes a first collision detector, a first collision determination part, a behavior detector, a behavior determination part, a traveling state determination part, and a safety controller. The first collision detector detects the vehicle collision. The first collision determination part determines whether a first collision has occurred based on a detection result of the first collision detector. The behavior detector detects' a vehicle behavior. The, behavior determination, part determines whether the vehicle behavior is abnormal or not based on a detection value of the behavior detector. The traveling state determination part determines whether a dangerous traveling is performed when the first collision determination part has determined the first collision, and when the behavior determination part has determined a behavior abnormality. The safety, controller executes the safety stop control for the vehicle when the traveling state determination part has determined the dangerous traveling.

According to the vehicle safety control system in the present disclosure, when a behavior abnormality after a first collision is detected, a safety stop control is performed for a vehicle which is in a dangerous traveling state. Therefore, it is possible to prevent a multiple accident from occurring after the first collision.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
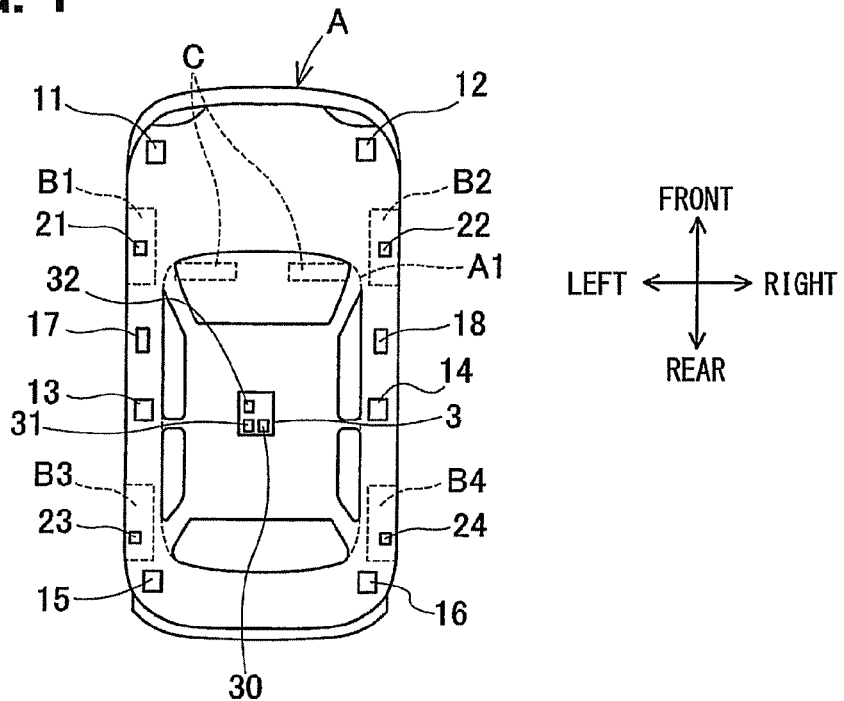
FIG. 1 is a diagram illustrating a configuration of a vehicle safety control system of a first embodiment.

Embodiments of the present disclosure will be explained with reference to drawings. Incidentally, in each embodiment described below, identical or similar parts each other are denoted by the same symbols. Furthermore, it should be noted that each drawing used for explanation is a conceptual drawing, and a shape of each part in the drawing is not necessary to represent an actual shape.

First Embodiment

The vehicle safety control system of the first embodiment, as described in FIG. 1, includes front accelerometers 11, 12, front-seat side accelerometers 13, 14, rear-seat side accelerometers 15, 16, indoor pressure sensors 17, 18, tire pressure sensors 21 to 24, and an airbag ECU 3.

The front accelerometers 11, 12 are an acceleration sensors to measure acceleration along a vehicle front-and-rear direction (corresponding to an x axis direction), and placed to the front of the vehicle outside a compartment A1. The front-seat side accelerometers 13, 14 are the acceleration sensors to measure acceleration along a vehicle crosswise, direction (corresponding to a y axis direction), and placed to a vehicle lateral (within doors) outside the compartment A1. The rear-seat side accelerometers 15, 16 are the acceleration sensors to measure acceleration along a vehicle crosswise direction (corresponding to the y axis direction), and placed to the rear of the vehicle outside the compartment A1.

The indoor pressure sensors 17, 18 are a pressure sensor to measure an inner pressure of a side door of the vehicle, and placed to the vehicle lateral (within the doors) outside the compartment A1. Incidentally, the compartment A1 denotes a space (or an area) that an occupant of the vehicle A boards, and corresponds to a substantially cuboid area, which is defined, by the space from foot (or bottom) of an occupant space to a ceiling, from a windshield to a rear glass, and from an inner lateral part of the left door to an inner lateral part of the right door. The compartment A1 includes an area that is not exposed to the occupant space. The area not exposed to the occupant space includes a storage box or the like.

The tire pressure sensors 21 to 24 (corresponding to curb contact detection sensors) are tire pressure sensors, which are respectively placed to tires B1 to B4 of the vehicle. The tire pressure sensors 21 to 24 detect a change of air pressure in the tires B1 to B4. The various sensors 11 to 18, which are placed outside the compartment A1, are connected to the airbag ECU 3 by wiring, and transmit detection results to the airbag ECU 3. The various sensors 11 to 18 in the first embodiment function as satellite sensors so that redundancy is given to a determination of a deployment of the airbag C. Therefore, the various sensors 11 to 18 may not be mounted in the present disclosure. The tire pressure sensors 21 to 24 are communicable to the airbag ECU 3 by wireless communication.

The airbag ECU 3 is an electric control unit for controlling the deployment of the airbag C, which is an occupant protection apparatus. Incidentally, although the airbag ECU 3 is used in the present embodiment, another in-vehicle ECU may be used.

The airbag ECU 3 is placed to a position (e.g., a lower space of an air-conditioner operation panel or the like) that is not exposed to the occupant space of the compartment A1. The airbag ECU 3 is placed around the center (e.g., corresponding to around the center between a driver seat and an assistant driver seat) of the vehicle A. The airbag ECU 3 mainly includes a microcomputer 30, a gyro sensor 31 (corresponding to a behavior detector), an accelerometer 32 (corresponding to a first collision detector), a memory (not shown), or the like.

The gyro sensor 31 is a sensor to measure a yaw rate (a yaw angular velocity), a role rate (a role angular velocity), and a pitch rate (a pitch angular velocity). The accelerometer 32 is an acceleration sensor to measure acceleration along the vehicle front-and-rear direction (corresponding to the x axis direction), acceleration along the vehicle crosswise direction (corresponding to the y axis direction), and a vehicle up-and-down direction (corresponding to a z axis direction). Incidentally, it may be acceptable that the accelerometer 32 as the collision detector measures acceleration in at least the vehicle front-and-rear direction and the vehicle crosswise direction.

Figure 2:
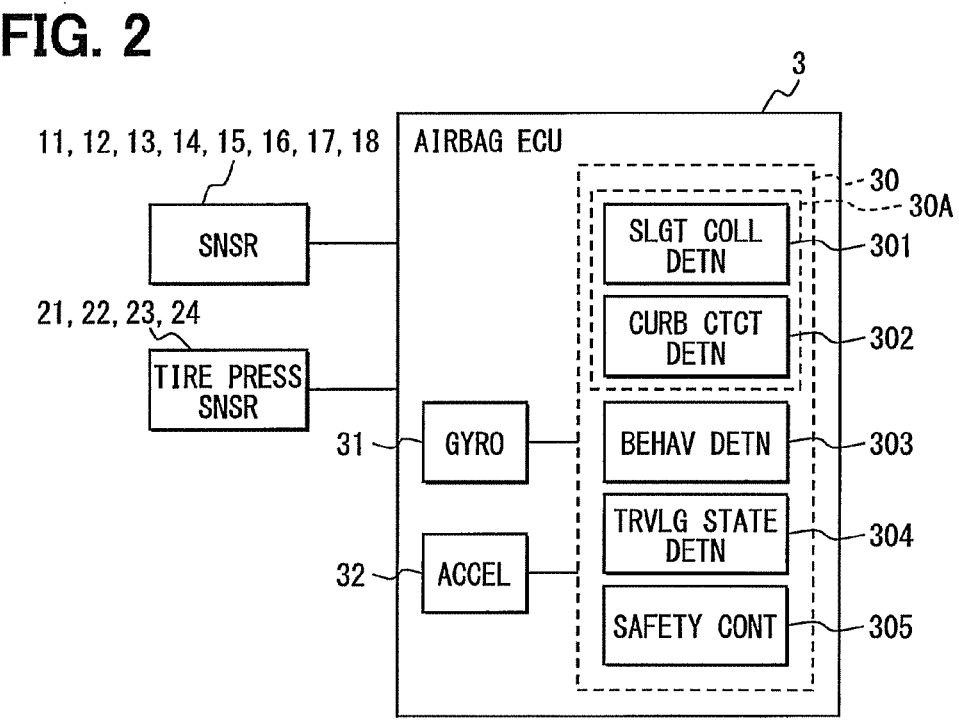
FIG. 2 is a diagram illustrating a detailed configuration of the vehicle safety control system of the first embodiment.

Herein, the airbag ECU 3, as described in FIG. 2, includes a slight collision determination part 301, a curb contact determination part 302, a behavior determination part 303, a traveling state determination part 304, and a safety controller 305, which are functions realized by the microcomputer 30 or the like.

The slight collision determination part 301 determines whether a slight collision has occurred based on a detection result of the accelerometer 32. Specifically, the slight collision determination part 301 stores a slight collision threshold value, which has been set for the accelerometer 32, compares the detection result of the accelerometer 32 with the slight collision threshold value, and, when either of the detection results on three axes exceeds the corresponding threshold value, determines that the slight collision has occurred. The slight collision determination part 301 transmits a determination result to the traveling state determination part 304. The slight collision threshold value is set less than an airbag threshold value (corresponding to a value at which the deployment of the airbag C is determined when the detection result exceeds the airbag threshold value) for the deployment of the airbag C. Thus, the slight collision threshold value is set at which the airbag C does not deploy.

The curb contact determination part 302 determines whether the curb contact has occurred to the tires B1 to B4 based on the detection result of the tire pressure sensors 21 to 24. Specifically, the curb contact determination part 302 stores a predetermined threshold value, compares the detection results of the tire pressure sensors 21 to 24 with the predetermined threshold value, and when either of the detection results of the tire pressure sensors 21 to 24 exceeds the predetermined threshold value, determines that the curb contact has occurred. The curb contact determination part 302 transmits a determination result to the traveling state determination part 304. As described above, the slight collision determination part 301 and the curb contact determination part 302 configure a first collision determination part 30A determining the first collision. Thus, when at least one of the slight collision and the curb contact has detected, the first collision determination part 30A determines that the first collision has occurred.

The behavior determination part 303 determines whether a behavior of the vehicle is normal or abnormal, based on the detection result of the, gyro sensor 31. Specifically, the behavior determination part 303 stores an angular velocity threshold value, corresponding to each angular velocity detected by the gyro sensor 31. The behavior determination part 303 compares the detection result of the gyro sensor 31 with the corresponding angular velocity threshold value, and when the detection result exceeds the corresponding angular velocity threshold value, determines that the behavior corresponds to a behavior abnormality. As describe above, the behavior determination part 303 stores the predetermined threshold value. The behavior determination part 303 transmits the determination result to the traveling state determination part 304.

The traveling state determination part 304, based on the determination result of the first collision determination part 30A and the determination result of the behavior determination part 303, determines whether a vehicle traveling state corresponds to a dangerous traveling (corresponding to a dangerous traveling state) or not. The traveling state determination part 304 stores a predetermined period, which is set in advance.

The traveling state determination part 304 starts to count a time after the traveling state determination part 304 receives a signal, indicating a first collision, from the first collision determination part 30A. When the traveling state determination part 304 receives another signal, indicating the behavior abnormality, from the behavior determination part 303 before the time passes the predetermined period, the traveling state determination part 304 determines that the vehicle traveling state corresponds to the dangerous traveling. In other words, the traveling state determination part 304, in a case where the first collision determination part 30A determines that the first collision has occurred and the behavior determination part 303 determines the behavior abnormality within the predetermined period, determines that the traveling state corresponds to the dangerous traveling. The traveling state determination part 304 transmits the determination result to the safety controller 305.

Figure 3:
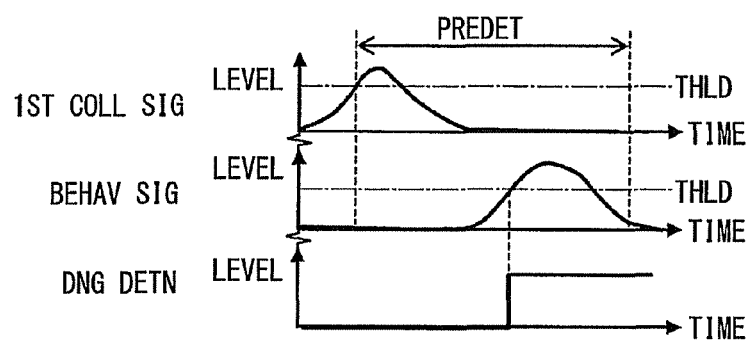
FIG. 3 is a diagram explaining a dangerous travel determination of the first embodiment.

For example, it is assumed that the slight collision has occurred. In this case, as described in FIG. 3, when the detection result of the accelerometer 32 has exceeded the slight collision threshold value and at least one of the detection results of the gyro sensor 31 exceeds the predetermined value within a predetermined period, the traveling state determination part 304 determines the dangerous traveling.

Figure 4:
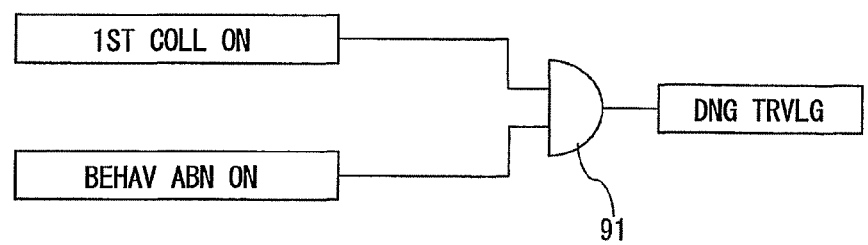
FIG. 4 is a diagram conceptually explaining the dangerous travel determination of the first embodiment.

It is possible to describe that functions of each of the parts 301 to 304, as described in FIG. 4, are conceptually represented by a form that the first collision determination result and the behavior abnormality determination result are inputted to a logical AND gate 91. Incidentally, a case where the first collision is detected corresponds to "ON", and a case where the behavior abnormality is detected corresponds to "ON". A case where the first collision is not detected corresponds to "OFF", and a case where the behavior abnormality is not detected corresponds to "OFF".

The safety controller 305, when the traveling state determination part 304 has determined the dangerous traveling, executes the safety stop control for the vehicle A. The safety stop control includes, for example, a fuel cutoff (corresponding to a fuel cutoff instruction to each ECU) to an engine, an intervention (corresponding to a vehicle stop instruction to each ECU) to an accelerator or brake operation, or the like. In addition to at least one of the above two control, the safety stop control may be exemplified by another safety stop control to execute an intervention of the steering operation, a lighting of a hazard indicator, or the like. In the first embodiment, the safety controller 305 executes a control to safely stop the vehicle by a combination of the above controls. Incidentally, the airbag ECU 3 is communicably connected to each ECU by wiring such as CAN (control area network) or the like.

Figure 5:
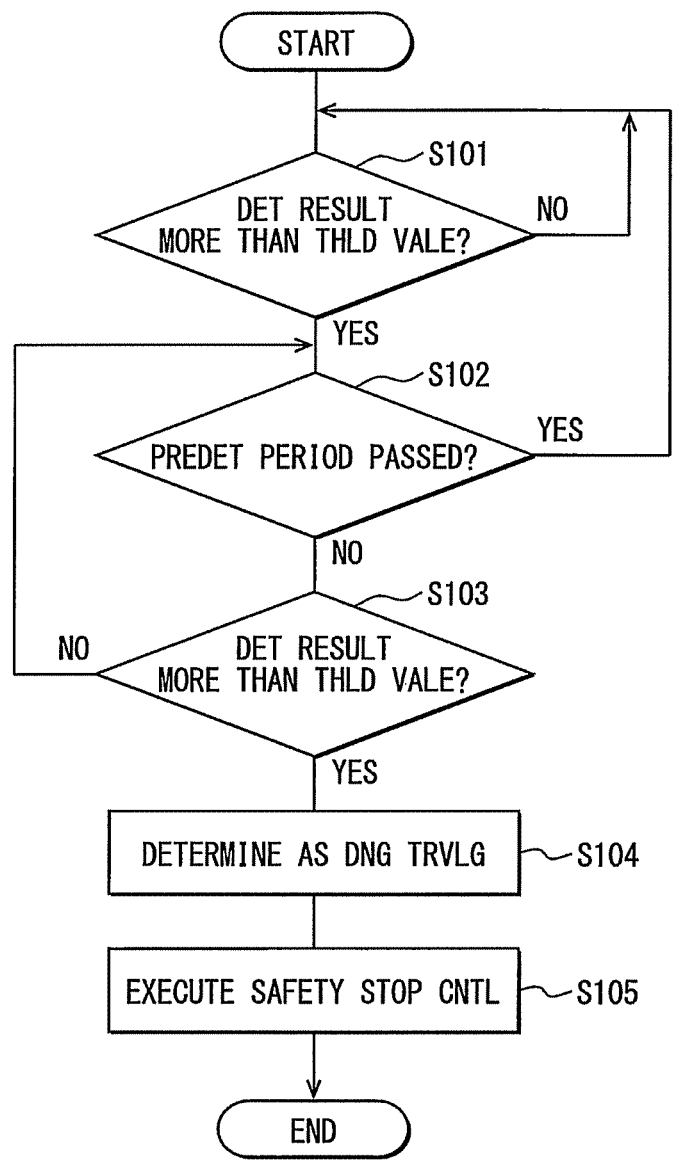
FIG. 5 is a flow chart illustrating a process in an airbag ECU of the first embodiment.

A process flow of the airbag ECU 3 of the first embodiment will be described briefly. As described in FIG. 5, the airbag ECU 3 determines whether at least one of the detection results of the accelerometer 32 and the tire pressure sensors 21 to 24 exceeds the corresponding threshold value (at 5101). When the detection result exceeds the threshold value (corresponding to "YES" at 5101), the airbag ECU 3 determines whether the predetermined period has passed from a time when the detection result exceeded the corresponding threshold value (S102). When the predetermined period has not been passed (corresponding to "NO" at S102), the airbag ECU 3 compares the detection result of the gyro sensor 31 with the predetermined threshold value (S103). When at least one of the detection results of the gyro sensor 31 exceeds the corresponding threshold value (corresponding to "YES" at S103), the airbag ECU 3 determines that the vehicle traveling state corresponds to the dangerous traveling (S104). The airbag ECU 3 transmits a signal to each ECU and executes the safety stop control (S105).

When the detection result of the gyro sensor 31 does not exceed the predetermined threshold value (corresponding to "NO" at S103), the process goes to S102 and it is determined whether the predetermined period has passed (S102). Incidentally, the airbag ECU 3 may measure a period from a time when the first collision (corresponding to the slight collision or the curb contact) has been detected to a time when the behavior abnormality has been detected, may compare the period with the predetermined period, and when the measured period is less than the predetermined period, may determine that the vehicle traveling state corresponds to the dangerous traveling. Thus, any other control flow may be applicable as long as the similar logic is used.

Figure 6:
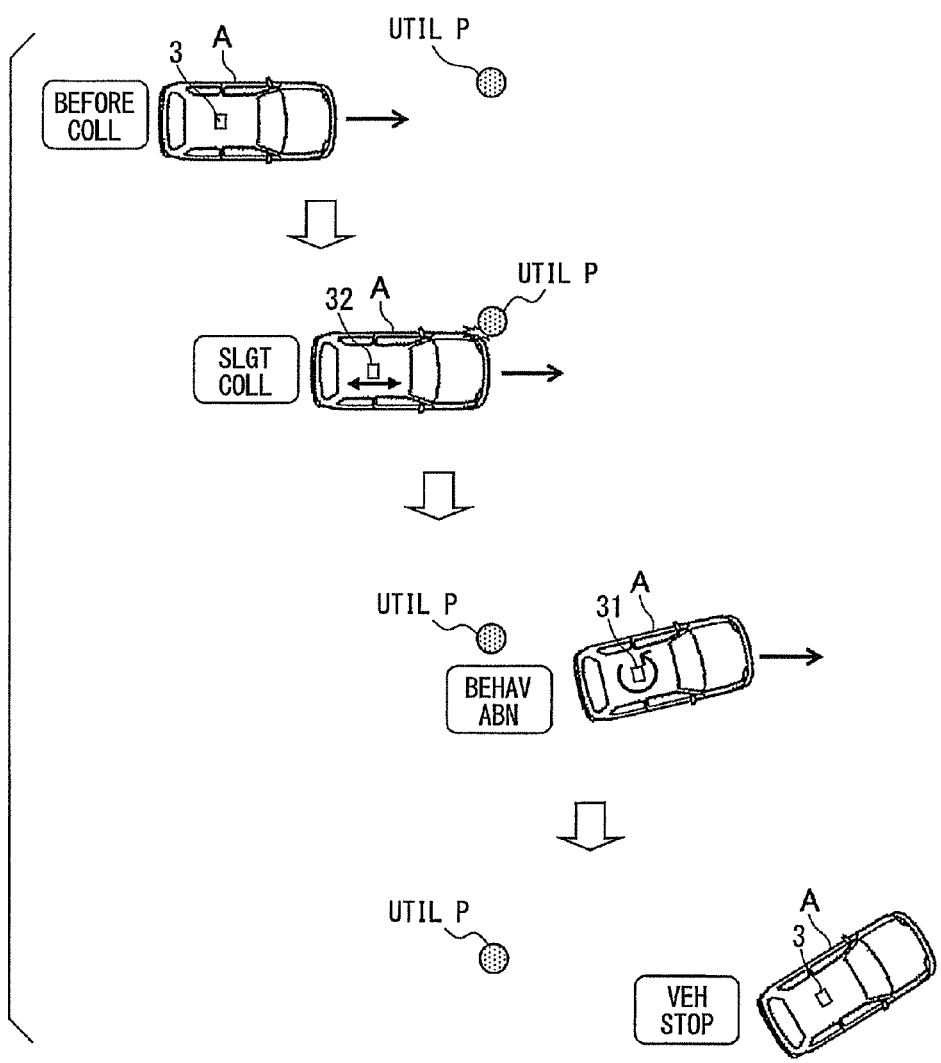
FIG. 6 is a diagram illustrating an example to explain a safety stop control of the first embodiment.

An example of the safety stop control according to the present embodiment will be described with reference to FIG. 6. When the vehicle A travels forward and when a front left side of the vehicle A collides with a utility pole, the accelerometer 32 detects a collision along the x axis direction, so that the acceleration along the x axis direction exceeds the slight collision threshold value (which is less than a threshold value that the airbag is deployed) and the slight collision determination part 301 determines that the slight collision has occurred. The vehicle A is rotated to the counterclockwise direction, the detection result (corresponding to the yaw rate) of the gyro sensor 31 exceeds the threshold angular velocity, so that the behavior determination part 303 determines the behavior abnormality. Since, after the slight collision, the behavior abnormality has detected within the predetermined period, the traveling state determination part 304 determines the dangerous traveling and the safety controller 305 executes the safety stop control. The vehicle A is rotated after the slight collision, a body of a driver is also rolled and it may be difficult to control a vehicle. According to the first embodiment, in this case, it is possible to stop the vehicle safely, so that it is possible to prevent multiple accidents.

Figure 7A:
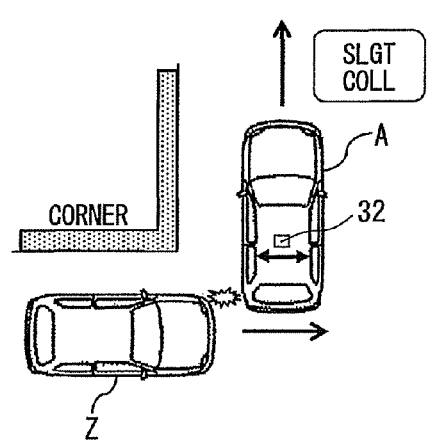
FIG. 7A is a diagram illustrating another example to explain the safety stop control of the first embodiment, and illustrating a case where a vehicle is collided by another vehicle to a rear left side of the vehicle.
Figure 7B:
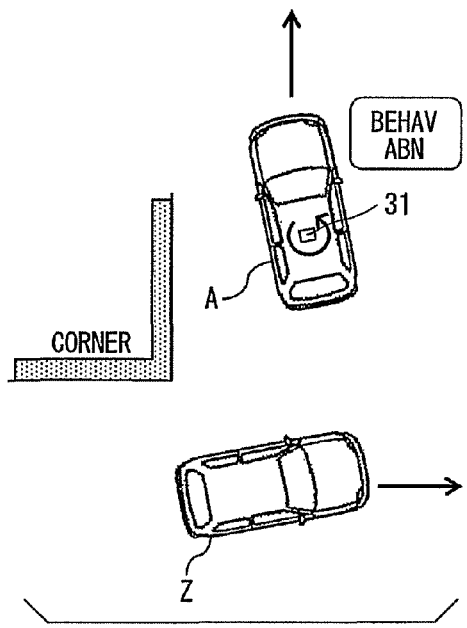
FIG. 7B is a diagram illustrating a state when a behavior abnormality is detected.

In addition, as described in FIG. 7A and FIG. 7B, when another vehicle Z collides to a rear left side of the vehicle A while the vehicle A travels forward, the accelerometer 32 detects a collision along the y axis direction so that the slight collision is detected. After this determination, the vehicle A is rotated to the counterclockwise direction, and the behavior abnormality is detected by the gyro sensor 31 and the behavior determination part 303 within the predetermined period, so that the safety stop control is executed.

Figure 8A:
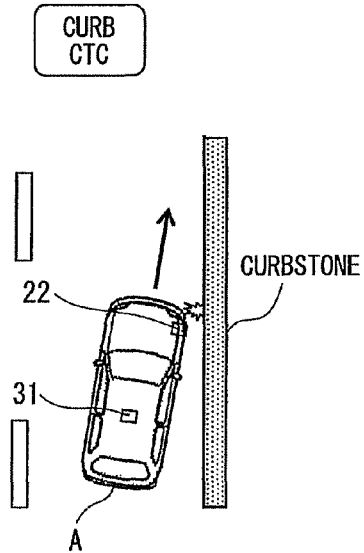
FIG. 8A is a diagram illustrating another example to explain the safety stop control of the first embodiment, and illustrating a case where the vehicle contacts with a curbstone.
Figure 8B:
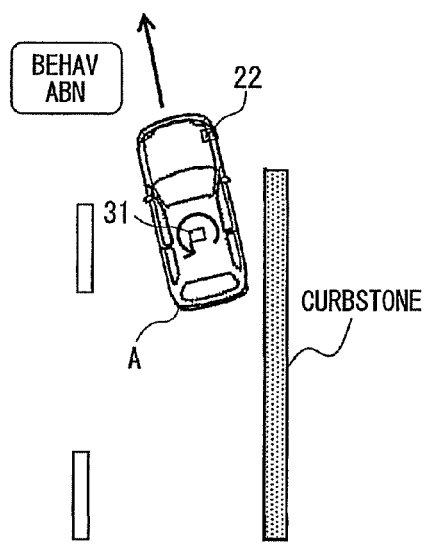
FIG. 8B is a diagram illustrating a state after a curb contact.

As described in FIG. 8A and FIG. 8B, when the vehicle A departures from a lane, and when the vehicle A contacts with a curbstone (e.g., a center divider, a sidewalk, or the like) at the right of the vehicle A during traveling forward, the tire pressure sensor 22 detects a contact, so that the curb contact determination part 302 determines that the curb contact has occurred. After this determination, in a case where the behavior abnormality is detected within the predetermined period similar to the above case, the safety stop control is executed.

The curb contact denotes that the vehicle A contacts to the curbstone (e.g., a center divider, a sidewalk, or the like).

According to the vehicle safety control system of the first embodiment, since the behavior abnormality is detected after the first collision and the safety stop control is executed to the vehicle, it is possible to prevent the multiple accidents from occurring after the first collision. Herein, the first collision is the slight collision, by which the airbag C does not deploy, or the curb contact. Due to the first collision determination and the behavior abnormality determination, it is possible to make a final determination of a state where it is difficult to continue a safe driving operation by the driver, and it is possible to determine the dangerous traveling precisely and to perform a safety stop procedure quickly.

Furthermore, according to the first embodiment, when the behavior abnormality is detected within the predetermined period after the first collision, it is determined that the vehicle traveling state corresponds to the dangerous traveling. Thus, when the first collision is highly associated with the behavior abnormality, it is possible to execute the safety stop control. Therefore, by setting the predetermined period, it is possible to improve reliability of determination of the dangerous traveling, representing that a behavior abnormality is caused by the first collision.

According to the first embodiment, since the accelerometer 32 is installed to the airbag ECU 3 and is used as one of the first collision detectors, it is possible to reduce an increase of a manufacturing cost. In addition, according to the first embodiment, since the tire pressure sensors 21 to 24, placed outside the compartment A1, is used as the first collision detector (e.g., the curb contact detection sensor), it is possible to precisely detect the curb contact. In addition, according to the first embodiment, since a sensor, placed to the center of the vehicle A in the compartment A1, is used as a behavior detector, it is possible to precisely detect a rotation behavior (i.e., the yaw movement, the roll movement, or the pitch movement) of the vehicle A. In the first embodiment, since the gyro sensor 31, which is placed to the airbag ECU 3 placed to the inside of the compartment A1 and can at least detect the yaw rate, is used as the behavior detector, it is possible to reduce increase of a manufacturing cost.

Second Embodiment

The vehicle safety control system in a second embodiment is different from the first embodiment in that various sensors 11 to 18, instead of the accelerometer 32, are used as the first collision detector. Each element in the second embodiment, which has the identical symbols with the first embodiment, represents the similar configuration in the first embodiment, and therefore the above description will be referred. In the second embodiment, the same drawings in the first embodiment are referred.

In the vehicle safety control system in the second embodiment, the slight collision determination part 301 determines whether the slight collision has occurred or not based on the detection result of the various sensors 11 to 18. Since the various sensors 11 to 18 are placed outside the compartment A1, it is possible to detect a collision more directly, and it is possible to detect the collision more precisely than the accelerometer 32.

In some cases, it is difficult for the satellite sensor to precisely determine a difference between the slight collision and a collision resulting in the deployment of the airbag C, and therefore the satellite sensor is usually used only for detection of the collision. Accordingly, in the slight collision determination part 301 in the second embodiment, a slight collision threshold value is set to an extent in which the collision is determined. In other words, the slight collision threshold value is a threshold value for determining whether a change in the detection result of the various sensors 11 to 18 has been caused by the collision or not. According to the second embodiment, in addition to the effects of the first embodiment, it is possible to detect the slight collision precisely.

Incidentally, the detection result of the various sensors 11 to 18 may be represented by an ON signal (corresponding to a case where the contact or the collision has occurred)/an OFF signal (corresponding to a case where the contact or the collision has not occurred). In this case, when the slight collision determination part 301 receives the ON signal, the slight collision determination part 301 determines that the collision has occurred. Incidentally, the slight collision threshold value in various sensors 11 to 18 may be set to a value less than a threshold value to deploy the airbag C.

Third Embodiment

The vehicle safety control system in a third embodiment is different from the first and second embodiment in that a measured value of a vehicle speed sensor (or a wheel speed sensor) 4, which is placed to the vehicle A, is used for the dangerous traveling determination. Each element in the third embodiment, which has the identical symbols with the first embodiment, represents the similar configuration in the first embodiment, and therefore the above description is referred.

Figure 9:
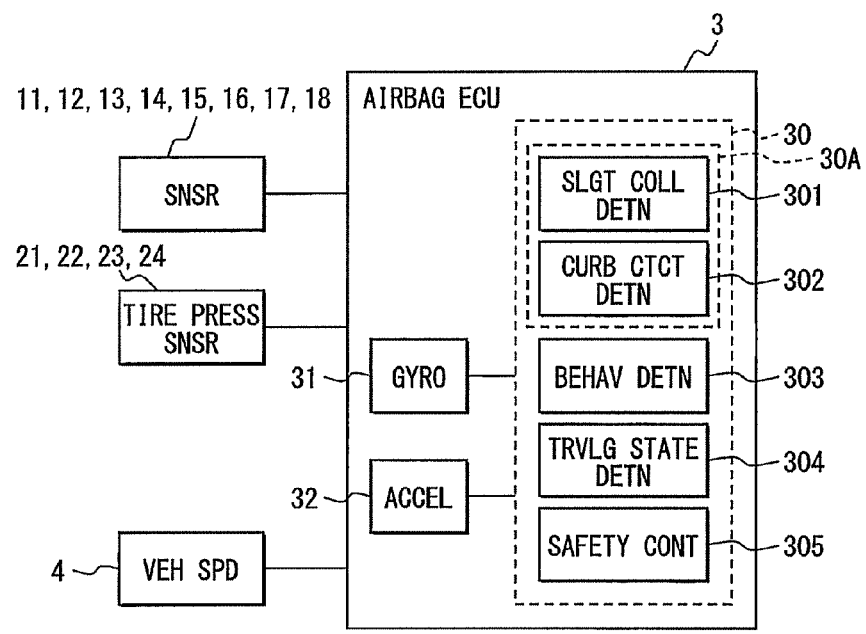
FIG. 9 is a diagram illustrating an detailed configuration of the vehicle safety control system of a third embodiment.

The vehicle safety control system in the third embodiment, as described in FIG. 9, includes the vehicle speed sensor 4 (corresponding to a vehicle speed measuring part) in addition to the configuration in the first embodiment. The measured value (e.g., a measured speed) by the vehicle speed sensor 4 is transmitted to the airbag ECU 3.

The traveling state determination part 304, when the first collision has been detected, stores the vehicle speed (corresponding to a first collision speed) when the first collision is detected, based on the measured value transmitted from the vehicle speed sensor 4. After the first collision is detected and determined, the traveling state determination part 304 compares the first collision speed with the predetermined speed, which is set in advance. When (i) the first collision speed exceeds the predetermined speed and (ii) the behavior abnormality is detected and determined within the predetermined period, the traveling state determination part 304 determines that the vehicle traveling state corresponds to the dangerous traveling.

Figure 10:
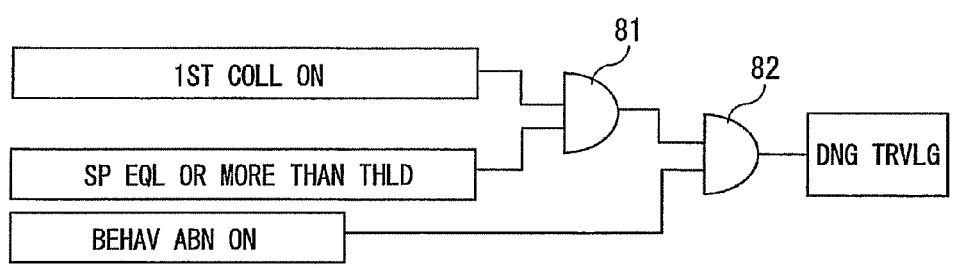
FIG. 10 is a diagram conceptually explaining a dangerous travel determination of the third embodiment

Conceptually, it is possible to describe that functions of each part 301 to 304, as described in FIG. 10, are represented by a form that the first collision determination result and the speed determination result are inputted to a logical AND gate 81, and then, an output of the logical AND gate 81 and the behavior abnormality determination result are inputted to a logical AND gate 82. According to the third embodiment, in addition to technical effects of the first embodiment, it is possible to prevent an unnecessary drive operation intervention in a state where the vehicle travels at low speed following the first collision at low speed.

Modified Embodiment

The present disclosure is not limited to the above embodiment. For example, in the first embodiment, a detection part to detect the first collision may include either of the accelerometer 32 and the tire pressure sensors 21 to 24. In this case, depending on the included sensor, the first collision determination part 30A includes either of the slight collision determination part 301 and the curb contact determination part 302.

Thus, the vehicle safety control system in the first embodiment may include the airbag ECU 3. The airbag ECU 3 may include the microcomputer 30 (i.e., the slight collision determination part 301, the behavior determination part 303, the traveling state determination part 304, and the safety controller 305), the gyro sensor 31, and the accelerometer 32. Alternatively, the vehicle safety control system of the first embodiment may include the tire pressure sensors 21 to 24, and the airbag ECU 3. The airbag ECU 3 may include the microcomputer 30 (corresponding to the curb contact determination part 302, the behavior determination part 303, the traveling state determination part 304, and the safety controller 305), and the gyro sensor 31. Similarly, in the second embodiment, each of the accelerometers 11 to 18 may be used as the first collision detector. In even this configuration, it is possible that the first collision is detected, and therefore, technical effects similar to the first embodiment are obtained.

Incidentally, the accelerometer 32 may be used as the behavior detector. Thus, the behavior determination part 303 may determine the behavior abnormality based on the acceleration detected by the accelerometer 32. In addition, when the detection value of the behavior detector exceeds a predetermined threshold value, the behavior determination part 303 may determine that the behavior abnormality has occurred. Herein, the detection value corresponds to (i) one of a value of the yaw rate, the roll rate, the pitch rate, the acceleration along the vehicle front-and-rear direction, the acceleration along the vehicle crosswise direction, and the acceleration of the vehicle up-and-down direction, or (ii) a combination of two or more of the yaw rate, the roll rate, the pitch rate, the acceleration along the vehicle front-and-rear direction, the acceleration along the vehicle crosswise direction, and the acceleration of the vehicle up-and-down direction. The behavior detector to detect the behavior of the vehicle may be any kind of sensors to detect at least one of the yaw rate, the roll rate, the pitch rate, the acceleration along the vehicle front-and-rear direction, the acceleration along the vehicle crosswise direction, and the acceleration of the vehicle up-and-down direction. The behavior detector may be a combination of the gyro sensor 31 and the accelerometer 32.

The first collision detector may be an acceleration sensor and a pressure sensor, and may be a contact sensor (e.g., a touch sensor) that is placed outside of the compartment A1 and detects a contact. The first collision detector may be a pressure sensor, which is connected to a chamber placed in a vehicle bumper.

Incidentally, the first collision detector (i.e., the curb contact detection sensor) may be an acceleration sensor, such as the accelerometer 32 for example, that measures the acceleration of the vehicle up-and-down direction. In this case, the curb contact determination part 302 determines the curb contact based on a change of the acceleration along the up-and-down direction. Alternatively, the curb contact detection sensor may be a tilt sensor.

The behavior detector may be a yaw rate sensor as described above. It is preferred that the yaw rate sensor is placed at the, center of the vehicle A. Since it is supposed that the behavior abnormality after the first collision be prone to be a rotation movement (corresponding to the yaw direction) around the z axis, it is preferred that the behavior detector measures the at least yaw rate. A sensor for detecting the collision outside the compartment A1 may be a single unit.

The traveling state determination part 304 may not be set by the predetermined period. The traveling state determination part 304, when the behavior abnormality is detected and determined after the first collision is detection and determined, determines the dangerous traveling. In this case, the dangerous traveling is not limited to immediately after the first collision. For example, it is supposed that a vehicle travels normally immediately after the first collision, but a malfunction or a difficulty occurs after a while, and the behavior abnormality occurs to go out of control. The dangerous traveling may occur in a case where the first collision occurs due to abnormality (e.g., a sudden illness) to the driver and the vehicle traveling state becomes in the behavior abnormality, or abnormality to the driver occurs immediately after the first collision and the vehicle traveling state becomes in the behavior abnormality. According to the vehicle safety control system in the present disclosure, it is possible to respond to the dangerous traveling and to stop the vehicle safely.

The behavior determination part 303 compares the acceleration of the vehicle crosswise direction, which has been detected by the accelerometer 32, after the determination of the slight collision with the predetermined acceleration threshold value, and when the detection result exceeds the acceleration threshold value (corresponding to the predetermined threshold value), the behavior determination part 303 may determine the behavior abnormality with supposing that the vehicle skids. In this case, the acceleration sensor of the y axis direction included in the accelerometer 32 corresponds to the behavior detector. In addition, it is possible to combine the first embodiment, the second embodiment, the third embodiment, and the modified embodiment each other.

According to an aspect of the present disclosure, the vehicle safety control system, which executes a safety stop control for safely stopping a vehicle after a vehicle collision is detected, includes a first collision detector, a first collision determination part, a behavior detector, a behavior determination part, a traveling state determination part, and a safety controller. The first collision detector detects the vehicle collision. The first collision determination part determines whether a first collision has occurred based on a detection result of the first collision detector. The behavior detector detects a vehicle behavior. The behavior determination part determines whether the vehicle behavior is abnormal or not based on a detection value of the behavior detector. The traveling state determination part determines whether a dangerous traveling is performed when the first collision determination part has determined the first collision, and when the behavior determination part has determined a behavior abnormality. The safety controller executes the safety stop control for the vehicle when the traveling state determination part has determined the dangerous traveling.

According to the vehicle safety control system in the present disclosure, a behavior abnormality after a first collision is detected, a safety stop control is performed for a vehicle which is in a dangerous traveling state. Therefore, it is possible to prevent a multiple accident from occurring after the first collision.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle safety control system that executes a safety stop control for safely stopping a vehicle after a vehicle collision is detected, the vehicle safety control system comprising:
    a first collision detector to detect the vehicle collision;
    a first collision determination part to determine, based on a detection result of the first collision detector, whether a first collision has occurred;
    a behavior detector to detect a vehicle behavior;
    a behavior determination part to determine, based on a detection value of the behavior detector, whether the vehicle behavior is abnormal or not;
    a traveling state determination part to determine that a dangerous traveling is performed when the first collision determination part has determined the first collision, and when the behavior determination part has determined a behavior abnormality; and
    a safety controller to execute the safety stop control for the vehicle when the traveling state determination part has determined the dangerous traveling.

2. The vehicle safety control system according to claim 1, wherein:
    the first collision detector is an acceleration sensor, which is placed in a compartment of the vehicle;
    the first collision determination part determines, based on a slight collision threshold value and the detection result of the first collision detector, whether the first collision has occurred; and
    the slight collision threshold value is set less than an airbag threshold value at which an airbag deploys.

3. The vehicle safety control system according to claim 1, wherein
    the first collision detector is placed outside a compartment of the vehicle.

4. The vehicle safety control system according to claim 1, wherein:
the first collision detector is a curb contact detection sensor; and
the curb contact detection sensor detects a curb contact to a tire of the vehicle.

5. The vehicle safety control system according to claim 1, wherein:
when the behavior determination part determines that the behavior abnormality has occurred within a predetermined period after the first collision determination part determines that the first collision has occurred, the traveling state determination part determines that the dangerous traveling has occurred.

6. The vehicle safety control system according to claim 1, further comprising:
a vehicle speed measuring part that measures a vehicle speed, wherein
in a case where, after the first collision determination part determines that the first collision has occurred, a measured speed by the vehicle speed measuring part exceeds a predetermined speed and the behavior determination part determines that the behavior abnormality has occurred, the traveling state determination part determines that the dangerous traveling has occurred.

7. The vehicle safety control system according to claim 2, wherein
the first collision detector is the acceleration sensor, which is placed to a substantially center of the compartment in a vehicle crosswise direction.

8. The vehicle safety control system according to claim 3, wherein
the first collision detector is an acceleration sensor, a contact sensor, or a pressure sensor.

9. The vehicle safety control system according to claim 4, wherein:
the curb contact detection sensor is an tire pressure sensor or an acceleration sensor; and
the acceleration sensor is installed to a substantially center in a vehicle crosswise direction in a compartment of the vehicle.

10. The vehicle safety control system according to claim 1, wherein:
the behavior detector is a gyro sensor, an acceleration sensor, or a combination of the gyro sensor and the acceleration sensor; and
the gyro sensor and the acceleration sensor are installed to a substantially center of a compartment of the vehicle in a vehicle crosswise direction.

11. The vehicle safety control system according to claim 1, wherein:
when the detection value detected by the behavior detector exceeds a predetermined value, the behavior determination part determines that the behavior abnormality has occurred; and
the detection value is:
one of a yaw rate, a roll rate, a pitch rate, a first acceleration along a vehicle front-and-rear direction, a second acceleration along a vehicle crosswise direction, and a third acceleration along a vehicle up-and-down direction; or
a combination of two or more of the yaw rate, the roll rate, the pitch rate, the first acceleration, the second acceleration, and the third acceleration.

12. The vehicle safety control system according to claim 8, wherein
the pressure sensor measures an inner pressure of a side door of the vehicle.

\* \* \* \* \*